United States Patent [19]
McEwen

[11] 3,732,957
[45] May 15, 1973

[54] FREE WHEEL DEVICE
[75] Inventor: John C. McEwen, Indianapolis, Ind.
[73] Assignee: General Motors Corporation, Detroit, Mich.
[22] Filed: Aug. 27, 1971
[21] Appl. No.: 175,569

[52] U.S. Cl. .................................................192/45
[51] Int. Cl. ..........................F16d 15/00, F16d 41/06
[58] Field of Search......................192/27, 38, 44, 45; 188/82.84

[56] References Cited
UNITED STATES PATENTS

| 3,103,998 | 9/1963 | Watson | 192/45 |
| 3,087,589 | 4/1963 | Gorsky | 192/45 |
| 1,942,909 | 1/1934 | Von Thungen | 192/45 |
| 2,481,066 | 9/1949 | Bagge | 192/45 |
| 3,054,489 | 9/1962 | Fahlberg | 192/45 |

FOREIGN PATENTS OR APPLICATIONS

| 918,339 | 10/1946 | France | 192/45 |
| 1,154,767 | 11/1957 | France | 192/45 |

Primary Examiner—Allan D. Herrmann
Attorney—J. L. Carpenter & Arthur N. Krein

[57] ABSTRACT

A free wheel unit including a drive unit with an outer surface forming an inner race and having an annular groove in the axial center thereof in which is disposed an expandable split bearing ring, a driven unit or outer race provided with a plurality of circumferentially arranged ramped recesses in each of which is disposed a roller, the rollers being biased radially outward into engagement with the ramped recesses by the expandable split bearing ring, the split bearing ring providing friction contact to rotate the rollers down the ramped recesses into engagement with the inner race to effectively lock the driven unit to the drive unit when the latter is rotated in one direction and to rotate the rollers out of engagement with the inner race when the drive unit is rotated in the opposite direction to place the driven unit in a free wheeling condition relative to the inner drive unit.

4 Claims, 3 Drawing Figures

PATENTED MAY 15 1973　3,732,957

INVENTOR.
John C. McEwen
BY Arthur N. Krein
ATTORNEY

FREE WHEEL DEVICE

This invention relates to a free wheel unit and, in particular, to an overrunning roller clutch device.

Various forms of free wheel devices are known in the art. Some of these free wheel devices are known as cage types in which a cage carries ball or roller bearings between an outer race housing and an inner race housing having portions of wedge-shaped configuration and for effecting radial movement of the balls or rollers into and out of engagement with the races. Another type of free wheel device, which may be referred to as a cageless type device, is disclosed in U.S. Pat. No. 3,103,998 issued Sept. 17, 1963, to Kenneth Watson.

In all of the prior known free wheel devices, the ball or rollers are locked against rotation when they are in a position to engage the drive member of the device to the driven member while being free to rotate when in position to effect overriding or free wheeling of the driven device relative to the drive unit. Accordingly, in all of the prior known free wheel devices, the balls or rollers, since they slip or slide in rubbing fashion during rotation while free wheeling, are subjected to galling or the creation of roller flats thereon. This, of course, limits the operational life of the unit and the speed at which they can be operated.

Accordingly, it is an object of this invention to provide an improved free wheel unit of simple construction which may be used at high operating speeds without having the rollers thereof in rolling contact with either the inner raceway or the outer raceway with which they cooperate when the device is free wheeling.

It is a further object of this invention to provide an improved free wheel unit in which the rollers of the unit do not rotate when the unit is in a free wheel condition to thereby reduce rubbing and subsequent wear between the roller elements and the raceways with which they cooperate.

These and other objects of the invention are attained by means of a free wheel unit having a bronze split bearing ring mounted in a central groove in the inner cylindrical race of a drive unit, a driven unit having an inner diameter bored surface with a plurality of circumferentially arranged outer raceway recesses therein providing inclined ramp surfaces encircling the drive unit and a roller positioned in each of the recesses and biased radially outward by the split bearing ring. When the drive unit is rotated in an engaged direction, the split ring which rotates in the same direction relative to the inner drive unit causes the rollers to rotate on the ramp surface to a position in which they are wedged between the inner cylindrical race and the outer race ramp surfaces to in effect engage the inner drive unit with the driven unit. In the overrunning direction, the split ring expands and spaces the rollers from the cylindrical inner race so that they are out of driving engagement with the inner drive unit, relative motion occurring between the split ring and the inner race, the split ring being in sliding engagement in the full overrunning position with the rollers whereby the rollers do not rotate.

For a better understanding of the invention, as well as other objects and further features thereof, reference is had to the following detailed description of the invention to be read in connection with the accompanying drawings, wherein.

Figure 1:
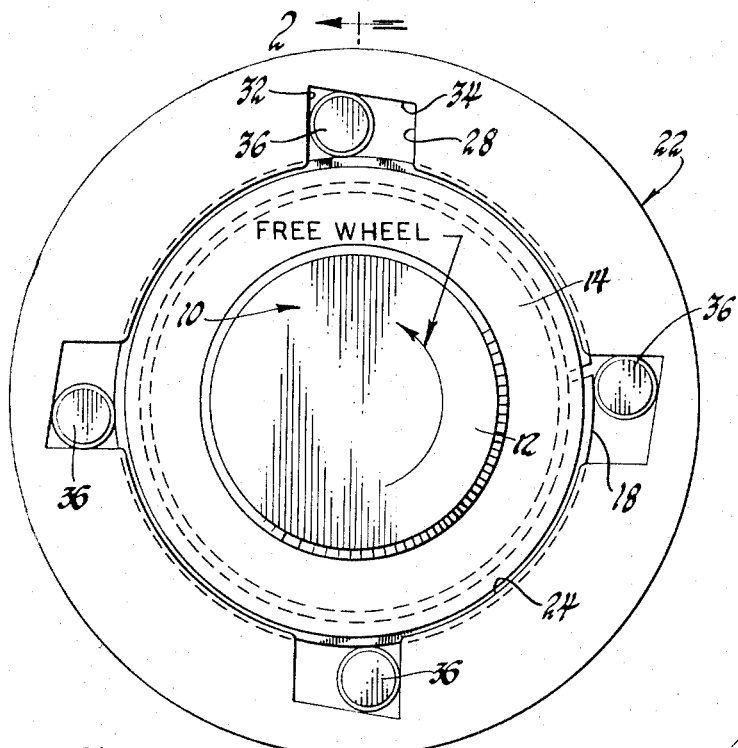
FIG. 1 is an end view of a free wheel unit of the invention.
Figure 2:
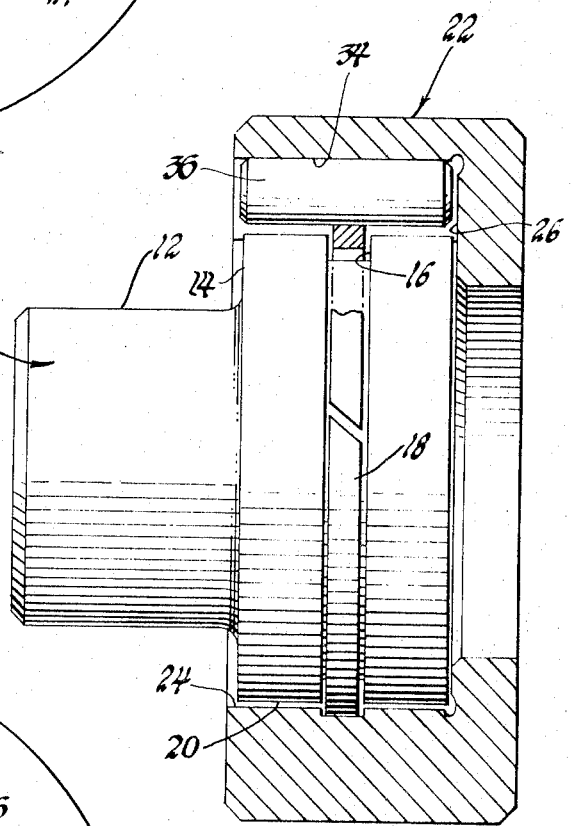
FIG. 2 is a sectional view of the free wheel unit of the invention taken along line 2—2 of FIG. 1; and, FIG. 3 is a view similar to FIG. 1 of an alternate embodiment of the free wheel unit of the invention.

Referring now to FIGS. 1 and 2, there is shown a simplified version of a free wheel unit constructed in accordance with the principles of the invention which includes a drive member, generally designated 10, having a drive shaft portion 12 and an enlarged annular journal portion 14 with an annular groove 16 axially centrally thereof to receive a split bearing ring 18 therein, the ring being made of bronze or other suitable bearing material. The width of the split ring relative to the groove is such so that the split ring, when in frictional contact with the drive member and with other elements of the free wheel unit as described hereinafter, will rotate with the drive member but relative thereto. The drive member 10, made of steel, has the outer surface of the journal portion thereof case hardened to provide an inner raceway or race 20.

Encircling the inner drive member 10 is a driven member 22 in the form of a cup-shaped case hardened steel shell provided with a bore 24 of a diameter slightly larger than the diameter of the inner race 20 of drive member 10, which terminates at a radially inward extending shoulder 26. A plurality of circumferentially arranged outer raceway recesses are provided in the inner periphery of the driven member, four such recesses being provided in the embodiment of the free wheel unit shown. As seen in FIG. 1, each such recess is formed by spaced apart, radially outward extending walls 28 and 32 with an annular inclined cam or ramp surface 34 therebetween, the ramps extending in a circumferential direction.

A roller 36 is disposed at each of the recesses, with each roller being normally biased radially outward into frictional engagement with the inclined ramp surface 34 by means of the split ring 18 which engages the outer peripheral surface of the rollers longitudinally in the center thereof. The rollers 36 are shown in FIGs. 1 and 2 in their free wheeling position, a position in which the drive member is rotated in a counter-clockwise direction as seen in FIG. 1 with the driven member held stationary and the rollers out of engagement with journal portion 14.

In operation, it will be seen from FIG. 1 that if the drive member 10 is rotated in a clockwise direction as seen in this figure, the split ring 18 which is always in engagement with the rollers 36 will rotate due to frictional engagement with the drive member in the same direction but relative thereto and effect rotation of the rollers 36. This will cause the rollers 36 to roll down the inclined ramp surfaces 34 to move inwardly, against the biasing action of the split ring 18, until they come into tight binding engagement between the ramp surface 34 and the inner race 20. When this occurs, the driven member is then locked by means of this camming wedge effect of the rollers 36 against the inner race of the drive member. The drive member and driven member can now be said to be in an "engaged" or "drive" position relative to each other.

When this clockwise rotation of the drive member 10 is terminated and then the drive member is rotated in a counterclockwise direction as seen in FIG. 1, and the driven unit is held against rotation as by frictional engagement with other elements not shown, the rollers 36 will be rotated momentarily by frictional engagement with the inner race 20 and, then further rotation of the rollers 36 is effected by engagement of the split ring 18 therewith, the split ring now rotating in a counterclockwise direction with the drive member, but relative thereto, to cause each of the rollers to roll up the inclined ramp surfaces 34 until they engage the wall 32 at which time they will be positioned radially outward from the inner race 20 of the drive member 10 with an air space therebetween. Each roller 36 when in this position is in frictional contact with its cooperating end wall 32 and ramp surface 34 and, is thereby frictionally held against further rotation even though the split ring 18 continues to rotate with the drive member 10, but relative thereto. As the split ring 18 rotates with the drive member but relative thereto, it slips relative to the rollers 36 when they are in this free wheel state or position. Since the rollers do not rotate when the unit is in the free wheeling position, they are not subject to galling or having flats formed thereon and the unit is thus operational at high speeds.

Thus, the only frictional driven engagement between the drive member 10 and these rollers 36, when the unit is in a disengaged or free wheel position, is through slip engagement of the bronze split ring 18 with the drive member 10 and its sliding engagement with the central portion of the rollers. Thus, the rolling contact surface of each roller, which is engageable with the journal portion 14 when engaged, is never subjected to frictional rolling engagement with either the journal portion 14 of the drive member 10 or the ramp surfaces 34 of the outer raceway recesses when the device is free wheeling.

Figure 3:
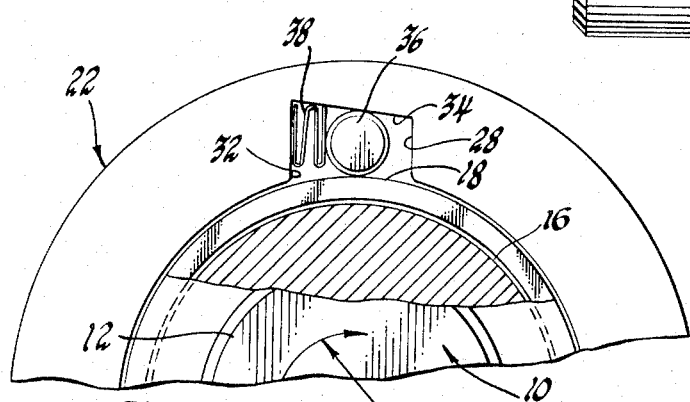

In the alternate embodiment of the free wheel unit of the invention shown in FIG. 3, wherein like reference numerals indicate like parts, this unit is identical to that shown and described with reference to FIGS. 1 and 2 except for the provision of a tickler spring 38 positioned in each of the recesses in the driven member. Each spring 38 abuts at one end against the wall 32 of the recess and at its other end against the roller 36 to normally bias the roller in direction to travel down the inclined ramp surface 34 to facilitate movement of the rollers inwardly against the biasing action of the split ring 18 into tight binding engagement between the ramp surface 34 and the journal portion 14 of the drive member 10 when the latter is rotated clockwise, as shown in FIG. 3.

When the drive member 10 is rotated counterclockwise, with the driven member 22 held against rotation, the rollers 36 as previously described will through frictional engagement against the split ring 18 be rotated to roll up the inclined ramp surfaces 34 against the biasing action of springs 38 until frictional engagement of the rollers 36 against springs 38 and ramp surfaces 34 prevents the rollers from spinning while the split ring then slips relative to the rollers which are then in the free wheel position out of direct engagement with the journal portion of the drive member 10.

What is claimed is:

1. A free wheel device including a drive unit with an outer surface forming an inner race and having an annular groove centrally disposed therein, an expandable split bearing ring positioned in said groove for rotation with said drive unit but relative thereto, a shouldered driven unit encircling said drive unit, said driven unit having a plurality of recesses therein arranged circumferentially around said inner race, each said recess being formed by spaced apart radially extending walls with an angular inclined ramp surface therebetween, a roller positioned in each of said ramped recesses in engagement with said split bearing ring and biased thereby into engagement with said ramp surface of the recess in which it is positioned.

2. A free wheel device according to claim 1 further including a spring positioned in each of said recesses in position to bias said rollers in a direction down the inclined ramp surfaces of said recesses.

3. A free wheel device including a drive unit with an outer surface forming an inner race and having an annular groove centrally disposed therein, an expandable split bearing ring positioned in said groove, a shouldered driven unit encircling said drive unit, said driven unit having a plurality of ramped recesses therein arranged circumferentially around said inner race, each said ramped recess being formed by spaced apart radially extending walls with an angular inclined ramp surface therebetween, a roller positioned in each of said ramped recesses in engagement with said split bearing ring and biased thereby into engagement with said ramp surface of the ramped recess in which it is positioned, said ramp surface of each of said ramped recesses being spaced from said inner race of said drive unit such that when said rollers are at one end of said ramped recesses said rollers are out of engagement with said inner race and when said rollers are at the opposite end of said ramped recesses said rollers engage said inner race to effect a driving connection between said drive unit and said shouldered driven unit.

4. A free wheel device according to claim 1 further including a spring positioned in each of said ramped recesses in position to bias said rollers in a direction down the ramp surfaces of said ramped recesses whereby said rollers move radially inward into driving engagement between said outer surface of said drive unit and said shouldered driven unit.

* * * * *